United States Patent [19]
Easton

[11] 3,719,844

[45] March 6, 1973

[54] DYNAMO-ELECTRIC MACHINES

[75] Inventor: Vivian Easton, Newcastle-upon-Tyne, England

[73] Assignee: Reyrolle Parsons Limited, Durham, England

[22] Filed: July 13, 1970

[21] Appl. No.: 54,133

[30] Foreign Application Priority Data

July 16, 1969 Great Britain.................35881/69

[52] U.S. Cl..................................310/184, 310/261
[51] Int. Cl................................................H02k 3/12
[58] Field of Search.............310/262, 270, 201–208, 310/180, 179, 184, 185, 64, 261, 61

[56] References Cited

UNITED STATES PATENTS

| | | | |
|---|---|---|---|
| 3,176,176 | 3/1965 | Willyoung | 310/270 X |
| 3,599,021 | 8/1971 | Guimbal | 310/61 |
| 967,254 | 8/1910 | Smoot | 310/262 |

*Primary Examiner*—D. F. Duggan
*Attorney*—Holman & Stern

[57] ABSTRACT

A rotor winding for a cylindrical air-gap dynamo-electric machine which winding is of concentric coil form wound on a rotor core formed of magnetic material, each coil having slot embedded portions disposed in axially extending slots formed in the rotor core and end-connecting portions disposed beyond the ends of the slots, one or more conductors forming a coil being modified in shape where the extension from a slot embedded portion to an end-connecting portion occurs in such a way that the radial depth of at least part of the end-connecting portion is less than the radial depth of the slot embedded portion.

2 Claims, 10 Drawing Figures

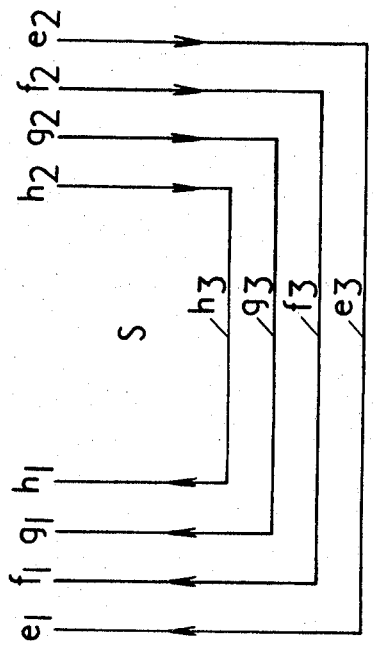
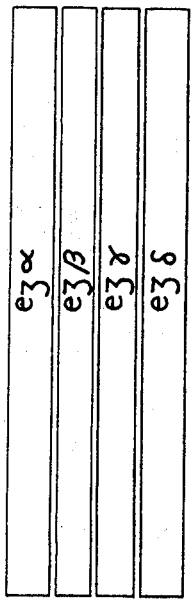
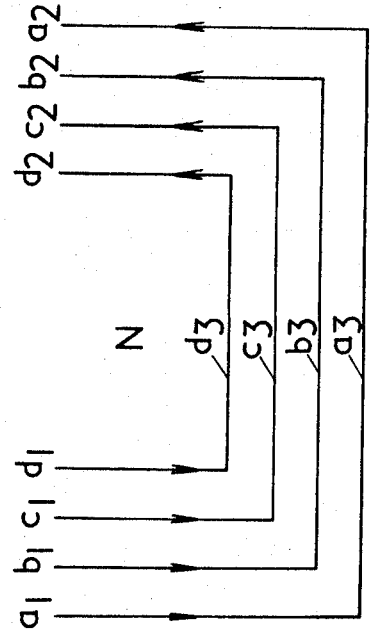
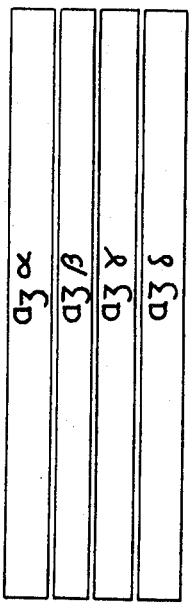
FIG.1. PRIOR ART
FIG.2. PRIOR ART

INVENTOR
VIVIAN EASTON
BY Holman & Stern
ATTORNEYS

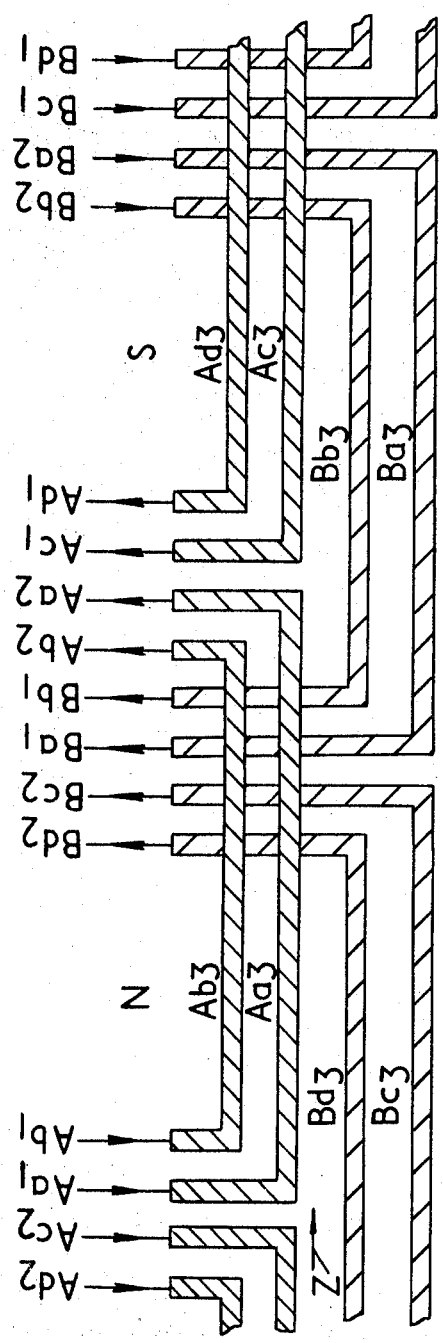

3,719,844

DYNAMO-ELECTRIC MACHINES

This invention relates to windings for dynamo-electric machines and particularly, though not exclusively, to rotor windings supplied with d.c. excitation current and acting as field windings.

In large alternating current generators of the turbo-generator type, and similar machines such as synchronous compensators and synchronous motors, the most common winding arrangement is to have a multi-phase stator winding and a rotor winding supplied with d.c. excitation current, the latter providing a rotating electric field for the machine. The form of winding in almost universal use for the rotors of such machines is a single layer winding known as a 'concentric coil' winding.

The normal form of concentric coil winding, whilst offering advantages in respect of its construction from mechanical considerations, can prove difficult to employ in certain arrangements of rotor windings such as those designed for liquid cooling of the winding or the separate excitation of sections of the winding.

The object of the present invention is to provide a winding for a dynamo-electric machine which is a single layer winding of modified concentric form and in which the above-mentioned difficulty is substantially reduced or eliminated.

The invention consists in a rotor winding for a cylindrical air-gap dynamo-electric machine which winding is of concentric coil form wound on a rotor core formed of magnetic material, each coil having slot embedded portions lying in axially extending slots formed in the rotor core and end-connecting portions disposed beyond the ends of the slots, one or more conductors forming a coil being modified in shape where the extension from a slot embedded portion to an end-connecting portion occurs in such a way that the radial depth of at least part of the end-connecting portion is less than the radial depth of the slot embedded portion.

The invention also consists in a rotor winding in accordance with the preceding paragraph in which a rotor winding in which the end-connecting portions of at least two coils overlap one another in the radial sense.

The invention also consists in a rotor winding in accordance with either of the preceding two paragraphs adapted to be supplied with d.c. excitation current, which rotor winding comprises at least two circumferentially displaced winding sections, each winding section being of concentric coil form.

The invention also consists in a rotor winding in accordance with the preceding paragraph in which at least one circumferentially extending layer of end-connecting portions of one winding section overlaps, as viewed radially of the rotor, at least part of one or more of the circumferentially extending layers of end-connecting portions of another winding section.

The invention also consists in a rotor winding in accordance with either of the two preceding paragraphs which winding is constituted by two electrically separate circumferentially displaced winding sections each section being adapted to be individually supplied by a separate source of d.c. excitation current.

The various features and advantages of the invention over conventional constructions can be better understood from the exemplary embodiments described hereinbelow and with reference to the accompanying drawings of which:

FIG. 1 shows part of a developed diagram of a conventional concentric coil form of winding for a dynamo-electric machine rotor;

FIG. 2 shows an end view of the conductors forming coil end-connections in the developed diagram of FIG. 1, looking in the direction of the arrow 'X' on the latter Figure;

FIG. 4 shows part of a developed diagram of a modified concentric coil form of winding for a dynamo-electric machine rotor in accordance with the present invention;

FIG. 5 shows an end view of the conductors forming coil end-connections in the developed diagram of FIG. 4, looking in the direction of the arrow 'Y' on the latter Figure;

Referring first to FIG. 1, a conventional concentric coil form of rotor winding is shown of the type commonly employed for large turbo-generators. In the example shown here, there are 16 coil sides; and, a cylindrical rotor core of magnetic material provided with two groups of eight slots, each slot containing only one coil side, would be provided to carry the winding and form part of the magnetic circuit of the machine.

In the diagram shown in FIG. 1, eight coils $a - h$ are wound in two groups of concentric coils, the four coils $a - d$ forming one group and coils $e - h$ the second group. Each coil has two coil side portions and two coil end-containing portions, only one end-connecting portion for each coil being shown. Thus, for example, coil $a$ has two coil side portions $a_1$, $a_2$ (hereinafter referred to simply as 'coil sides'), each located in a separate core slot and an end-connecting portion $a_3$ (hereinafter referred to as an 'end-connection'), the latter being situated outside of the rotor slot and forming part of the so-called 'overhang' of the winding. The full length of the coil sides $a_1$, $a_2$ is not indicated, for the sake of simplicity, and a second end-connecting portion closing coil $a$ at the ends (not shown) of the coil sides remote from portion $a_3$ is therefore omitted from the diagram.

Each coil such as coil $a$ may comprise a number of turns, say 4 turns, thus giving the same number of conductors in each slot, the conductors usually being stacked radially above one another in a slot. Coil $a$ may therefore comprise 4 turns, $a\alpha$, $a\beta$, $a\gamma$, $a\delta$, as is made clear by reference to the end view shown in FIG. 2, where the four conductors comprising the end-connection $a_3$ for coil $a$ are shown, these conductors obscuring the end-connection for coils $b$, $c$ and $d$. The end connecting conductors for coil $a$ are given the references $a_3\alpha$, $a_3\beta$, $a_3\gamma$ and $a_3\delta$ in FIG. 2, and corresponding references are given for the end connecting portion $e_3$ of coil $e$.

Each conductor may comprise a number of sub-conductors, sometimes referred to as 'strands,' but such sub-divisions of a conductor are not shown in any of the Figures accompanying this specification.

Figure 3:
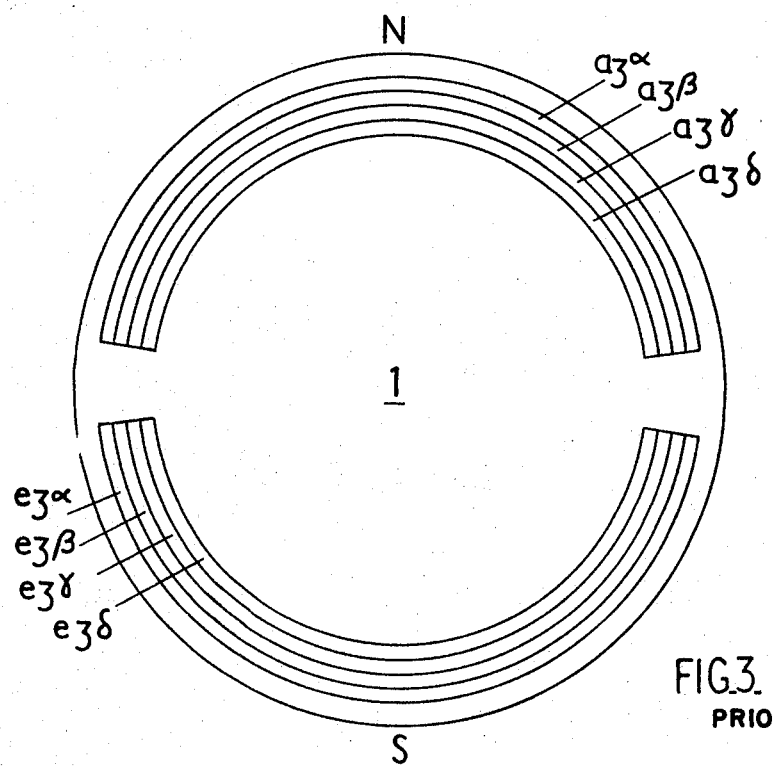
FIG. 3 shows, in simplified form an end elevation of a rotor winding of the form relating to FIGS. 1 and 2.

Passage of d.c. excitation current through the concentric group of coils $a$, $b$, $c$, $d$ in the direction of the arrows shown on the coil sides gives rise to a magnetic field in and about the rotor, a north (N) pole-face resulting at the rotor surface between the coil sides $d_1$ and $d_2$ of coil $d$. Similarly, a south (S) pole-face is produced between coil sides $h_1$ and $h_2$. The eight coil sides, comprising four coil sides from each concentric group, lying between each pair of pole-faces occupy a group of eight adjacent slots at opposite sides of the rotor. The distribution of pole faces N and S in relation to the end-connections of the coils is therefore as shown in FIG. 3, the rotor being indicated generally by reference numeral 1. The electrical connections between the four coils of each group of concentric coils are omitted to simplify the diagram, as also are the input and output connections to the winding and also the normal series connection between the two groups.

It will be appreciated from the end view shown in FIG. 2 that the simple concentric coil arrangement shown gives limited access in the axial direction to the inner concentric coils of each group, such as coils $b$, $c$ and $d$, at the end-connections. In accordance with the present invention, a modified concentric coil arrangement, as shown in FIG. 4 may be adopted giving improved access to the end-connections of a single layer winding where desired, for example, for providing individual exciting arrangements for separate sections of the winding.

Referring to FIG. 4, the rotor winding shown again comprises sixteen coil sides each of which is arranged to occupy a separate coil slot in a cylindrical rotor core to form a single-layer winding. The winding differs from that shown in FIG. 1, however, in that it comprises two separate winding sections, A and B.

Each winding section comprises two groups of concentric coils, with two coils in each group. Thus, section A comprises the group of two concentric coils A$a$ and A$b$ and the group of two concentric coils A$c$ and A$d$. The two coil sides of coil A$a$ are given the references A$a_1$ and A$a_2$ in the diagram, whilst the end connection has the reference A$a_3$, and similar references are given to the remaining coils of the winding.

Winding section B is circumferentially spaced around the rotor from section A, as shown, so that four coil sides of section A, such as A$b_2$, A$a_2$, A$c_1$ and A$d_1$, and four coil sides of section B, such as B$d_2$, B$c_2$, B$a_1$ and B$b_1$, lie in eight adjacent slots in the rotor surface. With d.c. excitation currents flowing in the directions indicated by the arrows, therefore, the N pole face produced by section A and given the reference $N_A$ in the diagram is circumferentially displaced from the N pole face $N_B$ produced by section B, and similarly for the S pole faces $S_A$ and $S_B$. If the excitation current in each winding section is the same, the resultant pole faces N and S due to the whole winding would be in the positions shown, but their positions may be controllably varied within a sector of the rotor by varying the excitation currents in the separate winding sections.

It is clear from a consideration of FIG. 4 that there must be crossing over, as viewed radially of the rotor, of the end-connections of the coils in section A and section B. In order to enable the end-connections to be made within a radial depth which does not exceed and may be less than the depth of a coil side in a rotor core slot, therefore, the end-connections are made flatter and wider than the side portions of a coil in windings according to the present invention. This is indicated in the diagram of FIG. 4 by drawing the end connection portions, such as A$b_3$, A$a_3$ etc., as shaded strips, whilst the coil side portions such as A$d_2$, A$c_2$, etc., are shown as single lines.

The end-connections A$a_3$, A$b_3$, A$c_3$ and A$d_3$ of winding section A need not be axially spaced from the end-connections B$a_3$, B$b_3$, B$c_3$ and B$d_3$, as shown in FIG. 4, but are preferably disposed to overlap each other in the radial direction. Thus end-connection A$b_3$ may overlap parts of end-connections B$d_3$ and B$b_3$, and end-connection A$a_3$ may overlap parts of end-connections B$c_3$ and B$a_3$.

Figure 6:
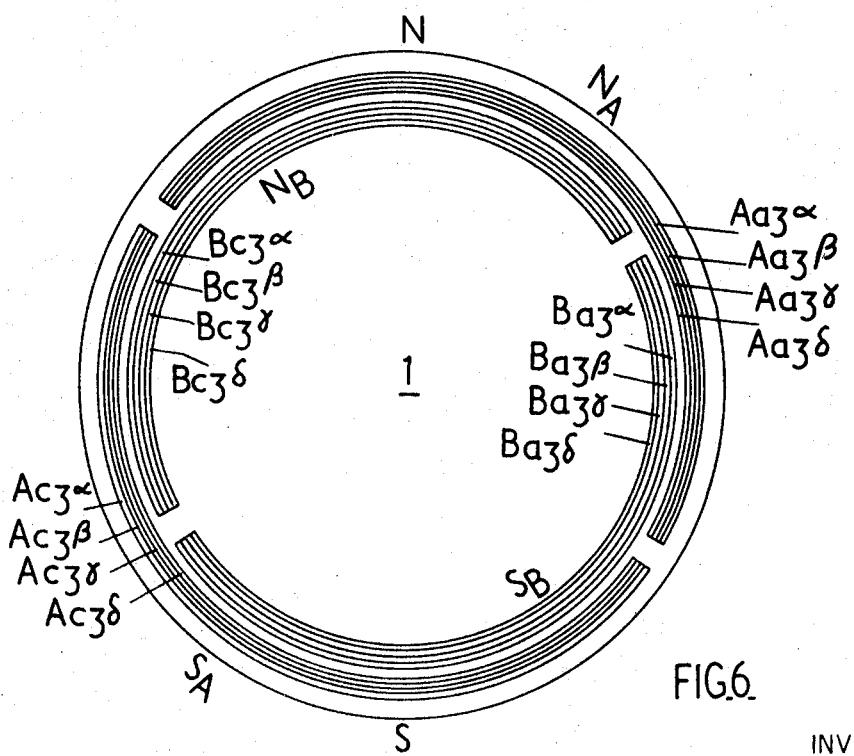
FIG. 6 shows, in simplified form an end elevation of a rotor winding of the form shown in FIGS. 4 and 5.
Figure 7:
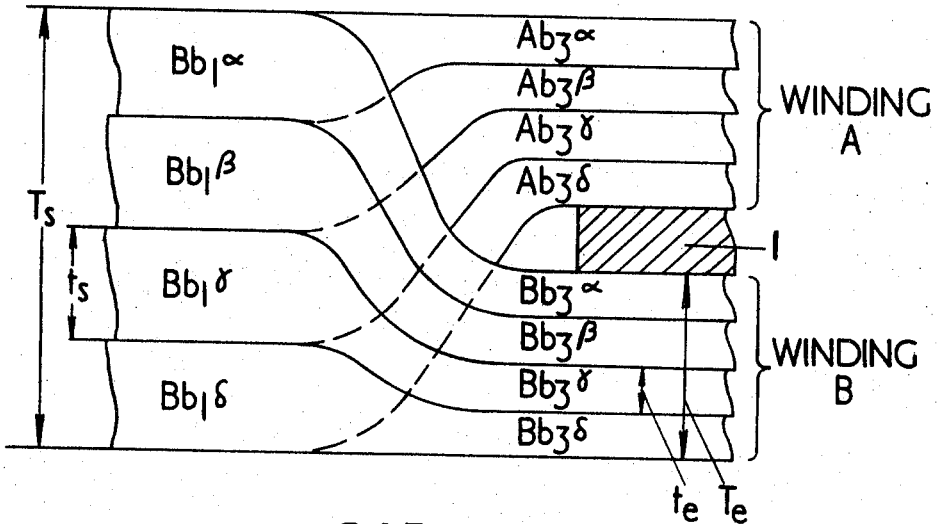
FIG. 7 shows a side elevation of a portion of the developed rotor winding shown in FIGS. 4 and 5 looking in the direction of the arrow 'Z' on FIG. 4.

The modification in conductor shape where the conductors of a coil pass from a side portion to an end-connecting portion are made clearer by reference to FIGS. 5 – 7, where four conductors per coil side are shown as an example. The four conductors of a coil side are given the sub-references $\alpha$, $\beta$, $\gamma$, $\delta$, in order from the uppermost to the lowermost conductor in a rotor slot in FIGS. 5 – 7 and also the subsequent Figures of the drawings.

As shown in FIG. 5, the end-connection A$a_3$, which obscures end-connection A$b_3$ in this view, is composed of four conductors A$a_3\alpha$, A$a_3\beta$, A$a_3\gamma$ and A$a_3\delta$ which may each be somewhat less than half the thickness of end-connections for a conventional concentric winding as shown in FIG. 2 wound in rotor slots of the same depth. The end elevation of FIG. 6 is similar to that of FIG. 3 for the conventional concentric winding, but shows the distribution of the resultant pole faces N and S for the modified winding shown in FIG. 4 if winding sections A and B have the same excitation current.

FIG. 7 shows how the conductors of a coil side are modified in shape in passing to an end-connection so that the end-connections of a coil of one winding section may lie in a circumferential layer overlapping, in a radial sense, the end-connections of a coil in the other winding section. The view is taken circumferentially around the rotor as indicated by the arrowed line Z in FIG. 4, considering end-connection A$b_3$ to overlap end-connection B$b_3$ in the radial sense, that is to say, these two end-connections not being axially displaced from one another as would appear from the diagram of FIG. 4.

In FIG. 7 the radial depth of a coil side is indicated by reference $T_s$ and the radial depth of each of its four conductors by $t_s$. The radial depth of the coil end-connections is $T_e$, and that of the individual conductors in the end-connections is $t_e$. As shown, conductors B$b_1\alpha$, B$b_1\beta$, B$b_1\gamma$ and B$b_1\delta$ in coil side B$b_1$ are flattened so that their thickness decreases from $t_s$ to $t_e$, and at the same time are bent downwards so that their continuations in end-connection $Bb_3$ stack into a circumferential layer of radial depth $T_e$ somewhat less than half $T_s$. Similarly conductors $Ab_2\alpha$, $Ab_2\beta$, $Ab_2\gamma$ and $Ab_2\delta$ in coil side $Ab_2$ (hidden by side $Bb_1$ in FIG. 7) are flattened and bent upwards to stack into a circumferential layer, forming end-connection $Ab_3$, lying radially above end-connection $Bb_3$ and overlapping part of it. In addition to being flattened, the conductors may be widened to maintain their cross-sectional area the same or substantially so. A layer of insulation 1 between the end-connections of sections A and B is required, as shown.

Referring again to FIG. 5, it is clear that the winding described with reference to FIGS. 4 – 7 allows ready access to four coil end-connections as opposed to only two in the winding shown in FIGS. 1 – 3, whilst each winding contains a total of eight coils wound in a single layer in the rotor slots. The construction of the modified concentric coil winding in accordance with the invention hence simplifies the making of end-connections to winding sections A and B to allow these sections to be excited independently.

Figure 8:
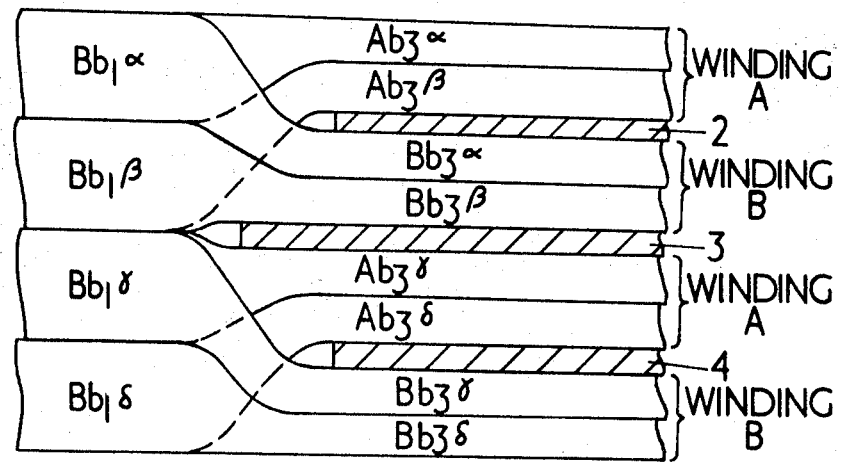
FIG. 8 shows, in a similar side elevation to that of FIG. 7, an alternative form of coil end-connection construction in accordance with the invention to that shown in FIG. 7 for the winding shown in FIG. 4.
Figure 9:
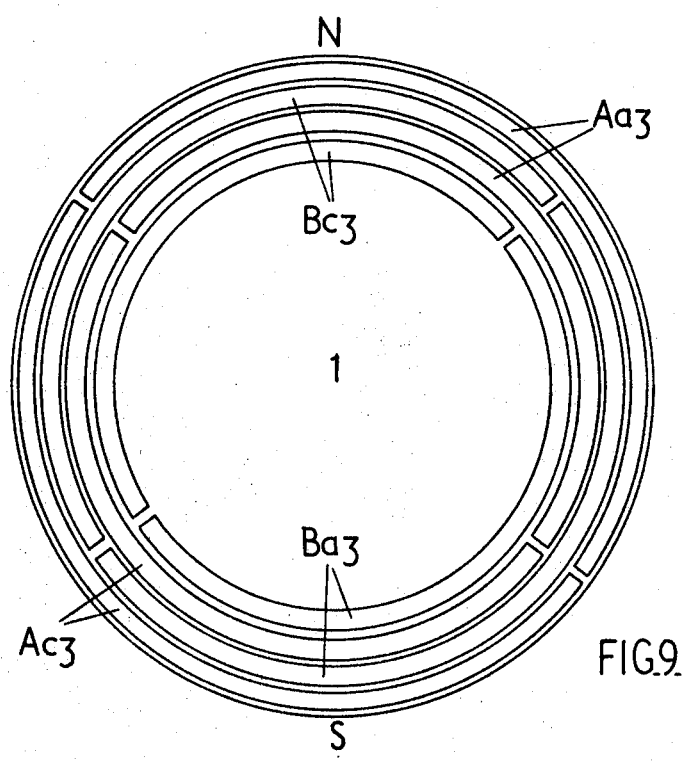
FIG. 9 shows, in simplified form, an end elevation of the rotor winding shown in FIG. 8.

The conductors of a coil-side need not all be formed into one thinner circumferential layer in the coil end-connections, but may alternatively be formed into two or more layers of different means diameters. In FIG. 8, for example, which is a similar view to that shown in FIG. 7, the conductors forming coil side $Bb_1$ are formed into two circumferential layers, these being an outer layer formed of end-connection conductors $Bb_3\alpha$ and $Bb_3\beta$, and an inner layer formed of end-connection conductors $Bb_3\gamma$ and $Bb_3\delta$. The conductors of coil side $Ab_2$ are similarly formed into two layers in the end-connection, and are stacked alternately with the two layers of end-connection $Bb_3$, three insulating layers 2, 3 and 4 being required, as shown. The end elevation of this modification is shown in FIG. 9.

Figure 10:
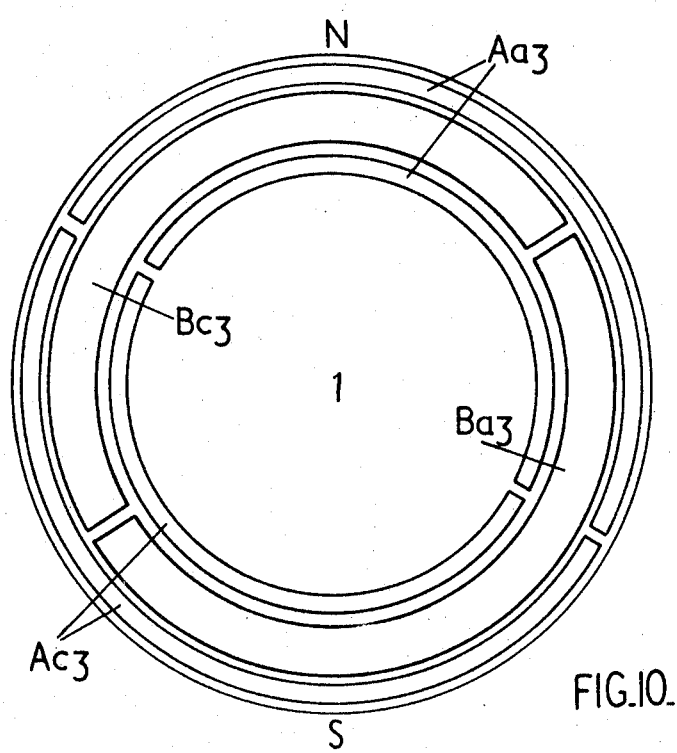
FIG. 10 shows, in simplified form, an end elevation of a further form of rotor winding in accordance with the invention.

In a further alternative form of construction for the end-connections, shown in end elevation only in FIG. 10, the conductors of coil sides in one winding section, say section A, may be formed into two circumferential layers of different mean diameter in the end-connections, whilst the conductors of coil sides in the other section B may be formed into a single circumferential layer lying between the end-connection layers of winding A. This arrangement has considerable constructional advantage in that the center insulation layer 3 of the arrangement shown in FIG. 8 is no longer required and that for each end-connection layer there is one coil conductor which has one face which is not radially displaced between its coil side position and end-connection position. With regard to the latter advantage, it will be noted that in the construction shown in FIG. 8 the lower face of conductor $Bb_3$ and the upper face of conductor $Ab_3\gamma$ are slightly displaced from the faces of the conductors as they lie in the coil sides to allow insulation layer 3 to be positioned between them.

Whilst in the embodiments of the invention described the two winding sections each occupy half the number of slots of a conventional concentric coil winding wound in the same number of rotor slots, the invention is not restricted to such arrangements. In a two-pole rotor having 16 slots, for example, one winding section may occupy six slots and the other ten slots.

The invention is not limited to two-pole field windings, but may be applied in field windings having more than two-poles.

Whilst in the embodiment of the invention described with reference to FIGS. 4–10, the conductors of a coil are reduced in radial height at the end-connection to somewhat less than one half their slot embedded depth, the invention is not limited to windings where the reduction in radial height is of the order of one half. Moreover, the portions of conductor which are reduced in radial dimension in the end connections need not necessarily be modified in width to an extent necessary to maintain their cross-sectional area of the same order throughout a coil.

I claim:

1. A rotor field winding for a cylindrical airgap dynamo-electric machine, comprising a plurality of slot-embedded windings of concentric form wound on a rotor core of magnetic material and disposed in axially extending slots in said rotor core, wherein each said winding includes a plurality of coils formed concentrically about a polar axis, said coils being wound out of a conductor and including end connecting portions for coil-interconnection disposed beyond ends of said axially extending slots, said end connecting portions including circumferentially extending portions, said rotor field winding characterized in that at least part of the conductor in said end connecting portions is formed to have a radial depth less than a corresponding radial conductor depth in a slot embedded region, and, said circumferentially extending portion of at least one coil is disposed to overlap in the radial sense the circumferentially extending portion of at least one of the remaining coils, thereby providing direct axial access to the ends of inner coils of the concentric form windings.

2. A rotor field winding as claimed in claim 1, wherein said plurality of slot-embedded windings are provided in the form of two separately excitable circumferentially displaced winding sections each section being of concentric coil form and wound about a separate polar axis and wherein said circumferentially extending portion of at least one coil of one of said winding sections is arranged to overlap in the radial sense the circumferentially extending portion of at least one of the coils of the second winding section, the polar axes of the two winding sections being in different axial planes.

* * * * *